United States Patent
Kuo et al.

(10) Patent No.: US 9,709,185 B1
(45) Date of Patent: Jul. 18, 2017

(54) FAUCET WITH QUICKLY REPLACEABLE VALVE CARTRIDGE

(71) Applicants: Yung-Feng Kuo, Changhua (TW); Pei-Lin Chao, Changhua (TW)

(72) Inventors: Yung-Feng Kuo, Changhua (TW); Pei-Lin Chao, Changhua (TW)

(*) Notice: Subject to any disclaimer, the term of this patent is extended or adjusted under 35 U.S.C. 154(b) by 0 days.

(21) Appl. No.: 15/057,970

(22) Filed: Mar. 1, 2016

(51) Int. Cl.
*F16K 27/00* (2006.01)
*E03C 1/04* (2006.01)

(52) U.S. Cl.
CPC ............ *F16K 27/00* (2013.01); *E03C 1/0404* (2013.01); *Y10T 137/7668* (2015.04)

(58) Field of Classification Search
CPC ... F16K 27/00; E03C 1/0404; Y10T 137/7668
USPC .............. 137/454.6, 625.17, 625.4
See application file for complete search history.

(56) References Cited

U.S. PATENT DOCUMENTS

| | | | | |
|---|---|---|---|---|
| 3,763,890 A | * | 10/1973 | Wolf ................... | F16K 3/246 137/454.6 |
| 5,129,417 A | * | 7/1992 | Dupont et al. .......... | F16K 5/202 137/315.26 |
| 6,394,133 B1 | * | 5/2002 | Knapp .................. | E03C 1/0404 137/615 |
| 6,571,826 B2 | * | 6/2003 | Ko ...................... | F16K 11/0787 137/454.6 |
| 8,028,714 B2 | * | 10/2011 | Chen ..................... | F16K 27/044 137/315.13 |
| 8,739,818 B1 | * | 6/2014 | Woods .................. | F16K 11/074 137/454.6 |

* cited by examiner

*Primary Examiner* — Kevin Lee
(74) *Attorney, Agent, or Firm* — Che-Yang Chen; Law Offices of Scott Warmuth

(57) ABSTRACT

A faucet with a quickly replaceable valve cartridge may include a faucet body, a valve cartridge base and a locating unit. The valve cartridge base is configured to provide an accommodating space for a valve cartridge, and the faucet body has a first chamber to receive the valve cartridge base, and the locating unit is configured to secure the valve cartridge base inside of the faucet body. When the valve cartridge of the faucet needs to be cleaned or replaced, by disengaging the locating unit from the faucet body, the valve cartridge base can be moved from the first chamber. Furthermore, the user can readily take out the valve cartridge from the valve cartridge base after disengaging an engaging ring from the valve cartridge base thereby achieving the quickly replaceable effect of the faucet valve cartridge.

6 Claims, 6 Drawing Sheets

US 9,709,185 B1

FAUCET WITH QUICKLY REPLACEABLE VALVE CARTRIDGE

FIELD OF THE INVENTION

The present invention relates to a faucet, and more particularly to a faucet with a quickly replaceable valve cartridge.

BACKGROUND OF THE INVENTION

Generally, a conventional faucet includes a faucet body, and after processing and manufacturing, at least a chamber and a flow channel are formed and settled inside the faucet body to provide an accommodating space for the valve cartridge thereby controlling water flowing of the faucet. However, this kind of the faucet has its shortcomings such as the difficulty of processing and manufacturing, and during the assembling process, a control valve of the faucet and other components need to be settled inside the faucet in sequence thereby increasing the difficulty of the assembly and the cost of time and money. Moreover, because of the complexity in structure, the valve cartridge of the faucet cannot be quickly replaced by a general user, thus reducing the practicability of the faucet. Also, although the general user knows that the damage to the valve cartridge or wear to O-rings of the faucet is the main factor in leakage water or reduced water output, it is still difficult for the general user to dismantle and replace the valve cartridge or other components inside the faucet because of the complexity of the faucet structure. As a result, the user may directly replace the whole faucet thereby increasing the cost of replacing. Therefore, there remains a need for a new and improved design for a faucet with a quickly replaceable valve cartridge to overcome the problems presented above.

SUMMARY OF THE INVENTION

The present invention provides a faucet with a quickly replaceable valve cartridge which comprises a faucet body, a valve cartridge base, and a locating unit. The faucet body has a first chamber, and at least a water inlet channel and a water outlet channel, which are respectively communicated with the first chamber. The first chamber is configured to receive the valve cartridge base, and a through hole outwardly penetrating through a lateral wall of the first chamber is configured to engage with the locating unit. The valve cartridge base comprises an accommodating space which is configured to receive a valve cartridge, and a bottom portion of the accommodating space has at least a water inlet hole and a water outlet hole. A locating groove formed at an outer wall of the valve cartridge base comprises a locating hole, and after the valve cartridge base placed into the first chamber, the locating hole of the locating groove is aligned with the through hole on the faucet body.

Comparing with conventional faucet, the present invention is advantageous because: (i) when the valve cartridge needs to be replaced, the user can simply disengage the locating column of the locating unit from the locating hole of the valve cartridge base such that the valve cartridge base together with the valve cartridge can be moved from the first chamber of the faucet body, and by disengaging an engaging ring from the valve cartridge base, the user can further move out the valve cartridge from the accommodating space of the valve cartridge base, thereby completing the disengaging process. In other word, the faucet valve cartridge in the present invention can be readily and quickly replaced, thus enhancing the practicability of the faucet body; and (ii) because of the leakage water or reduced water output always caused by the damage or blocking in the valve cartridge, it is advantage for the present invention when the valve cartridge thereof is easily to be replaced. Consequently, the faucet with a quickly replaceable valve cartridge in the present invention can reduce the cost in maintaining or replacing of the faucet and prolong the useful life of the faucet body.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
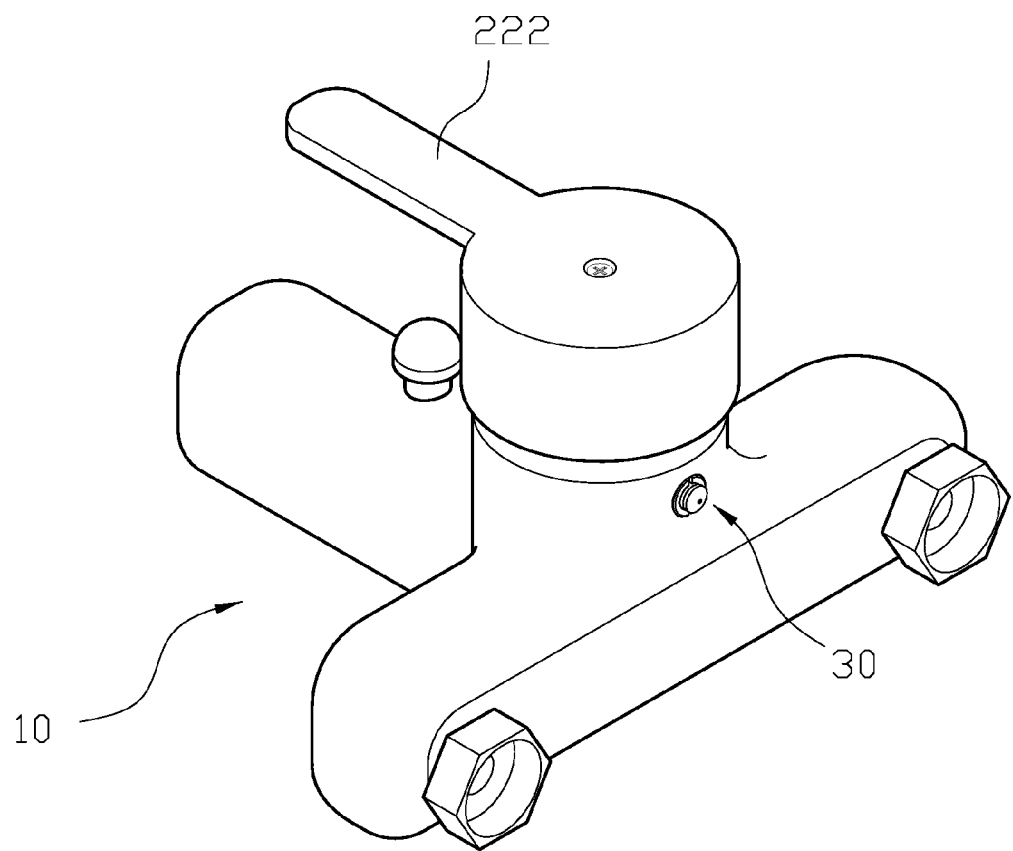
FIG. 1 is a three-dimensional view of a faucet with a quickly replaceable valve cartridge in the present invention.
Figure 2:
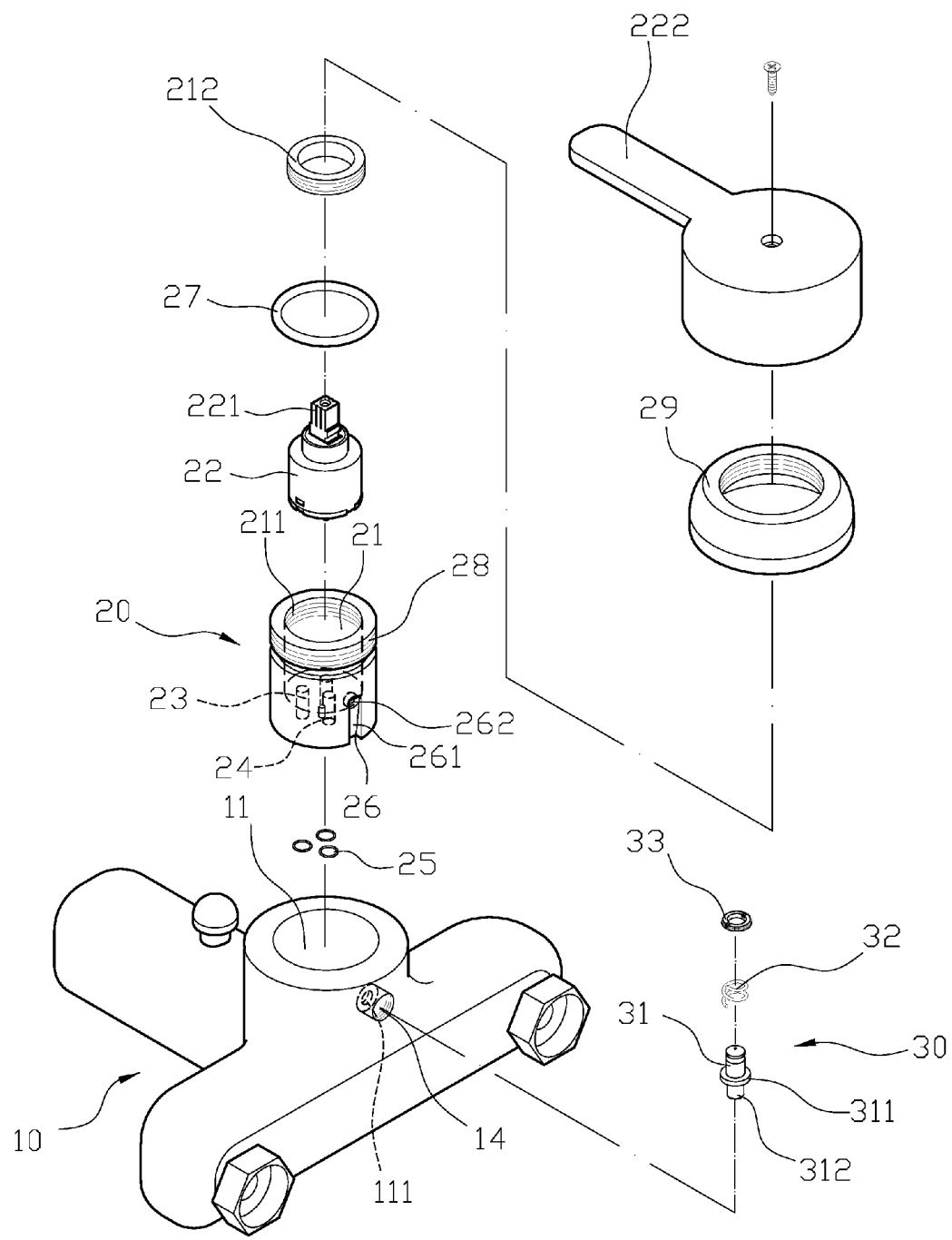
FIG. 2 is an exploded view of the faucet with a quickly replaceable valve cartridge in the present invention.

In order to further understand the goal, characteristics and effect of the present invention, a number of embodiments along with the drawings are illustrated as following:

Referring to FIGS. 1 and 2, the present invention provides a faucet with a quickly replaceable valve cartridge which comprises a faucet body (10), a valve cartridge base (20), and a locating unit (30). The faucet body (10) has a first chamber (11), and at least a water inlet channel (12) and a water outlet channel (13) are respectively communicated with the first chamber (11). Generally, an optimized embodiment of the faucet body (10) has two water inlet channels (12) to respectively provide the use of cold water and hot water. The first chamber (11) is configured to receive the valve cartridge base (20), and a through hole (111) outwardly penetrates through a lateral wall of the first chamber (11). The through hole (111) further is communicated with a second chamber (14) which penetrates through an outer wall of the faucet body (10) to receive and connect to the locating unit (30). The valve cartridge base (20) comprises an accommodating space (21) which is configured to receive a valve cartridge (22), and a bottom portion of the accommodating space (21) corresponding to the locations of two water inlet channels (12) of the faucet body (10) has a water inlet hole (23) and a water outlet hole (24) respectively. Furthermore, each of two gaskets (25) is respectively disposed on a lower end of the water inlet hole (23) and a lower end of the water outlet hole (24), and a first threaded section (211) formed at an inner periphery of the accommodating space (21) is configured to engage with an engaging ring (212). The valve cartridge (22) comprises a control rod (221) sticking out of the valve cartridge base (20) to connect to a handle (222). A locating groove (26) formed at an outer wall of the valve cartridge base (20) comprises an oblique surface (261) and a locating hole (262) which are respectively formed at a lower portion and an upper portion thereof. Also, after the valve cartridge base (20) is placed into the first chamber (11), the locating hole (262) of the locating groove (26) is aligned with the through hole (111) on the faucet body (10). A sealing ring (27) disposed on an outer periphery of the valve cartridge base (20) bears against an inner wall of the first chamber (11), thus achieving the sealing effect between the valve cartridge base (20) and the faucet body (10). A second threaded section (28) formed at an upper outer periphery of the valve cartridge base (20) is configured to engage with a cover (29). The locating unit (30) comprises an axle rod (31), an elastic unit (32) and a locating ring (33). The axle rod (31) further has a flange (311) protruding from an outer periphery thereof, and a locating column (312) axially extends from the flange (311). The elastic unit (32) and the locating ring (33) are coupled around the outer periphery of the axle rod (31). Furthermore, the locating ring (33) is coupled with an inner periphery of the second chamber (14) to secure the locating unit (30) inside the second chamber (14).

Figure 3:
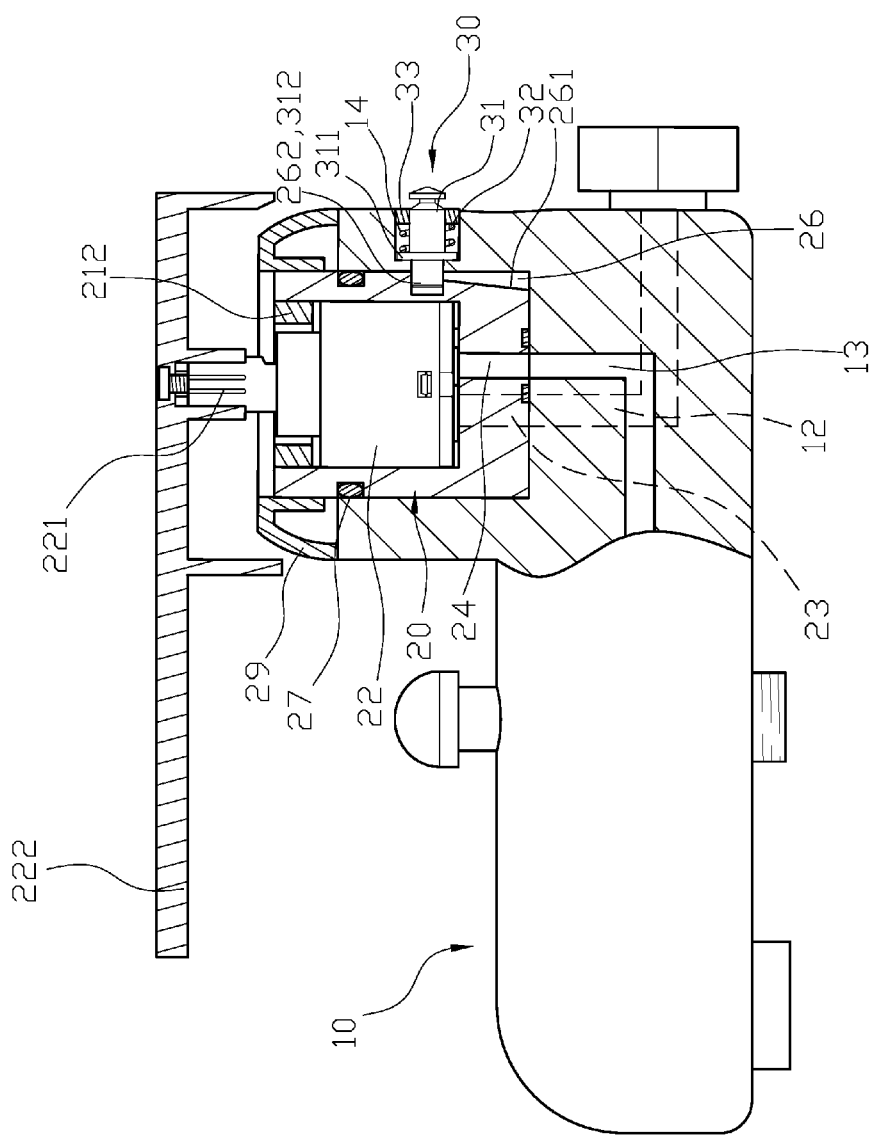
FIG. 3 is a sectional assembly view of the faucet with a quickly replaceable valve cartridge in the present invention.

Referring to FIGS. 1 to 3, the faucet body (10) is connected to the locating unit (30) through the second chamber (14). The locating unit (30) has the axle rod (31), and the elastic unit (32) and the locating ring (33) are disposed on the outer periphery of the axle rod (31). The locating unit (30) is inserted into the second chamber (14) through the axle rod (31) together with the elastic unit (32), and is secured inside the second chamber (14) by coupling the locating ring (33) with the inner periphery of the second chamber (14). Moreover, the elastic unit (32) which is borne against the flange (311) forces the locating column (312) to penetrate through the through hole (111) into the first chamber (11). The first chamber (11) of the faucet body (10) is configured to accommodate the valve cartridge base (20), and the valve cartridge base (20) further has the accommodating space (21) to receive the valve cartridge (22). After the valve cartridge (22) is received in the accommodating space (21), the engaging ring (212) is engaged with the first threaded section (211) of the accommodating space (21) to secure the valve cartridge (22) inside the accommodating space (21). Moreover, the second threaded section (28) of the valve cartridge base (20) is engaged with the cover (29), and the control rod (221) of the valve cartridge (22) sticks out of the cover (29) to connect to the handle (222), thereby completing the assembling process between the valve cartridge (22) and the valve cartridge base (20). When the locating unit (30) is connected to the faucet body (10), the locating column (312) of the locating unit (30) inwardly penetrates through the through hole (111) to protrude from the inner wall of the first chamber (11). Thus, when the valve cartridge base (20) together with the valve cartridge (22) is received in the first chamber (11) of the faucet body (10), the locating groove (26) of the valve cartridge base (20) can slide downwardly along a lower portion of the locating column (312) which inwardly protrudes from the inner wall of the first chamber (11) such that the oblique surface (261) of the locating groove (26) can force against the locating column (312) to move outwardly until the locating hole (262) of the locating groove (26) is connected to the locating column (312) thereby securing the valve cartridge base (20) inside the first chamber (11). Furthermore, the water inlet channel (12) and the water outlet channel (13) of the first chamber (11) are respectively aligned with the water inlet hole (23) and water outlet hole (24) which are formed at the bottom portion of the accommodating space (21) to complete the assembling process between the faucet body (10) and the valve cartridge base (20) together with the valve cartridge (22), and, by operating the handle (222), the faucet can provide cold and hot water, or achieve the on/off operation.

Figure 4:
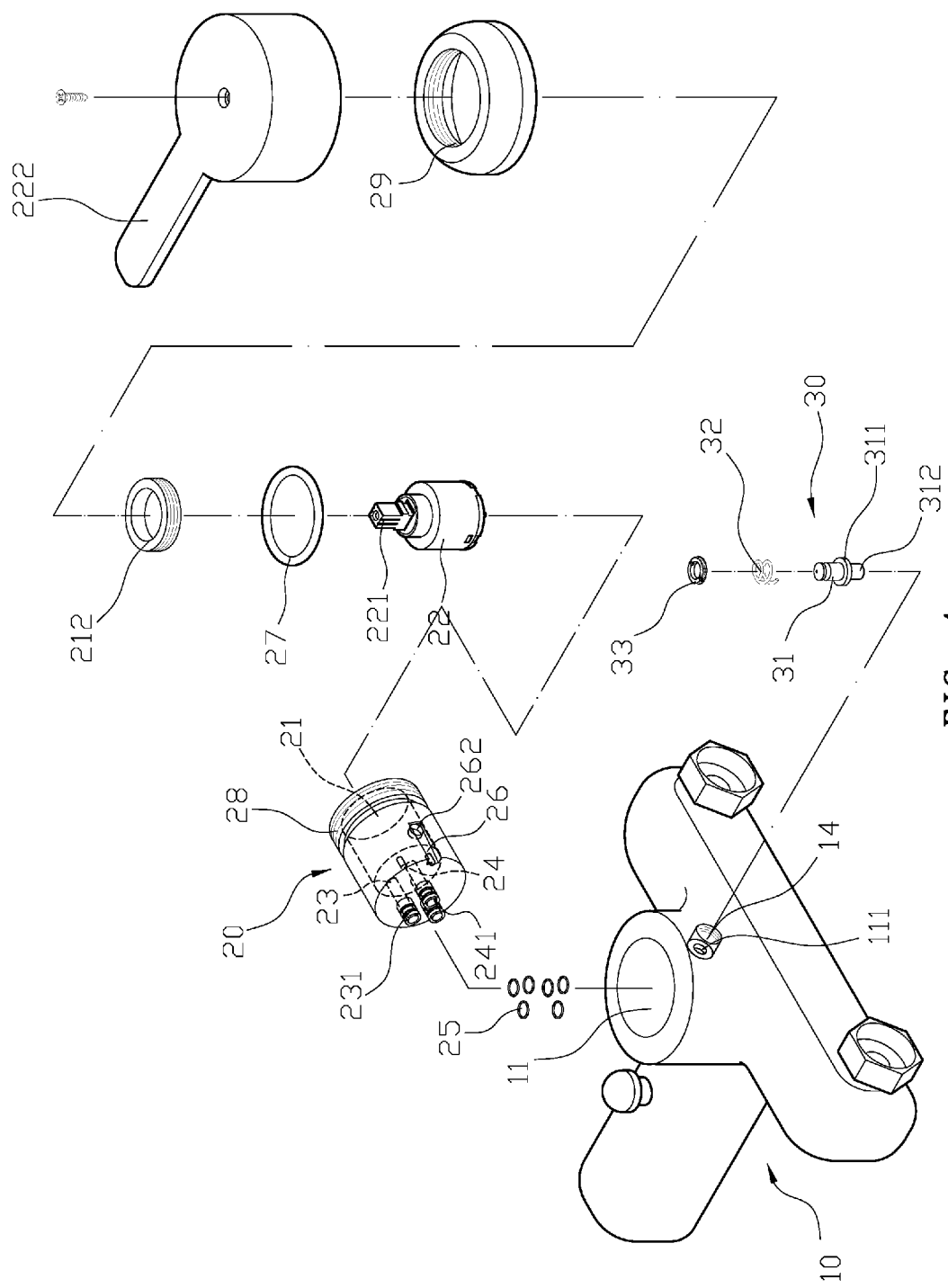
FIG. 4 is an exploded view of another embodiment of the faucet with a quickly replaceable valve cartridge in the present invention.
Figure 5:
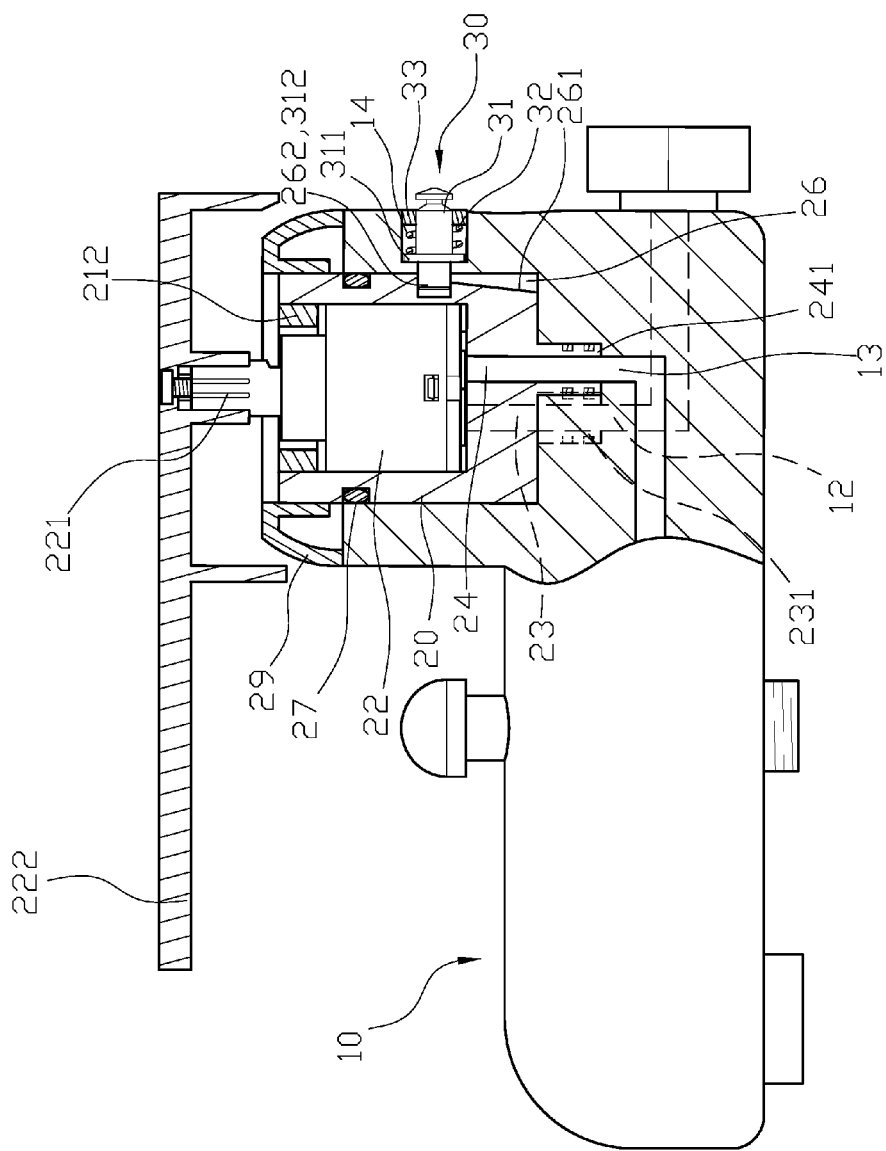
FIG. 5 is a sectional assembly view of another embodiment of the faucet valve with a quickly replaceable cartridge in the present invention.

In one embodiment, referring to FIGS. 4 and 5, the water outlet hole (23) and the water inlet hole (24) formed at the bottom portion of the accommodating space (21) of the valve cartridge base (20) are respectively connected to a first locating tube (231) and a second locating tube (241), and each of two gaskets (25) is disposed on the first locating tube (231) and the second locating tube (241) respectively. Thus, when the valve cartridge base (20) is placed into the first chamber (11) of the faucet body (10), the first locating tube (231) and the second locating tube (241) can be respectively inserted into the water inlet channel (12) and the water outlet channel (13) to secure the valve cartridge base (20) inside the faucet body (10).

Figure 6:
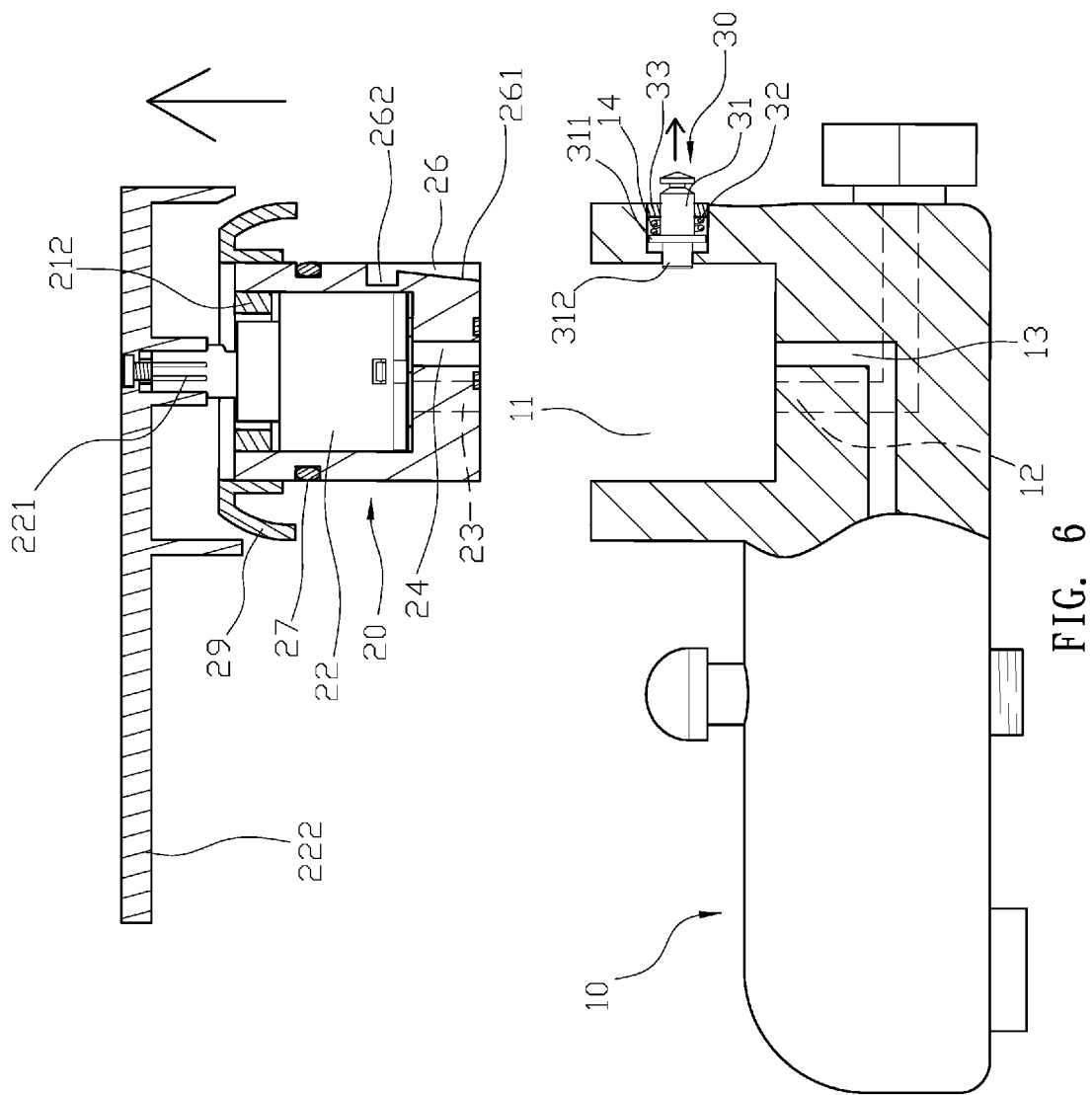
FIG. 6 is a schematic view of the faucet with a quickly replaceable valve cartridge in the present invention when a valve cartridge base is disengaged from a faucet body.

In actual application, referring to FIGS. 3 and 6, by operating the handle (222), the faucet body (10) can provide both cold and hot water, or achieve the on/off operation. However, when the leakage of water or reduced water output occurs and leads to a need of replacing the valve cartridge (22), the user can pull the locating unit (30) out of the second chamber (14) of the faucet body (10) so as to disconnect the locating column (312) with the locating hole (262) of the valve cartridge base (20). Therefore, the valve cartridge base (20) can be moved out from the first chamber (11) of the faucet body (10). Furthermore, after disengaging the handle (222) and the engaging ring (212) from the valve cartridge base (20), the valve cartridge (22) can be moved from the accommodating space (21) of the faucet body (10) to achieve the replacing and maintaining process. In addition, after the valve cartridge (22) is replaced, the valve cartridge base (20) together with the valve cartridge (22) can be placed back into the first chamber (11), and is secured inside the faucet body (10) by engaging the locating unit (30) with the locating hole (262).

In another embodiment, the through hole (111) on the faucet body (10) is designed as an internal threaded hole while the locating unit (30) is designed as a bolt such that after the valve cartridge base (20) placed into the first chamber (11), the locating unit (30) can be screwed through the through hole (111) and the locating hole (262) of the valve cartridge base (20) to secure the valve cartridge base (20) inside the faucet body (10).

Comparing with conventional faucet, the present invention is advantageous because: (i) when the valve cartridge (22) needs to be replaced, the user can simply disengage the locating column (312) of the locating unit (30) from the locating hole (262) of the valve cartridge base (20) such that the valve cartridge base (20) together with the valve cartridge (22) can be moved from the first chamber (11) of the faucet body (10), and by disengaging the engaging ring (212) from the valve cartridge base (20), the user can further move out the valve cartridge (22) from the accommodating space (21) of the valve cartridge base (20), thereby completing the disengaging process. In other word, the faucet valve cartridge in the present invention can be readily and quickly replaced, thus enhancing the practicability of the faucet body (10); and (ii) because of the leakage water or reduced water output always caused by the damage or blocking in the valve cartridge (22), it is advantage for the present invention when the valve cartridge (22) thereof is easily to be replaced. Consequently, the faucet valve cartridge in the present invention can reduce the cost in maintaining or replacing of the faucet and prolong the useful life of the faucet body (10).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A faucet with a quickly replaceable valve cartridge comprising:
    a faucet body having a first chamber and at least a water inlet channel and a water outlet channel which are respectively communicated with the faucet body, and a through hole, which penetrates through a lateral wall of the faucet body, configured to connect to a locating unit; and
    a valve cartridge base received in the first chamber comprising an accommodating space configured to receive the valve cartridge, and a bottom portion of the accommodating space having at least a water inlet hole and a water outlet hole, an outer wall of the valve cartridge base having a locating groove, and a locating hole which is formed at an upper end of the locating groove aligned with the through hole of the faucet body,
    wherein the through hole penetrating through the lateral wall of the faucet body is extended to communicate with a second chamber which is configured to receive a locating unit, and the locating unit comprises a axle rod, an elastic unit and a locating ring, wherein the axle rod comprises a flange, and a locating column axially extends from the flange, the elastic unit and the locating ring are coupled around an outer periphery of the axle rod, and the locating unit is secured inside the second chamber by coupling the locating ring with an inner periphery of the second chamber, and by bearing the elastic unit against the flange, the locating column penetrates through the through hole into the first chamber.

2. The faucet with a quickly replaceable valve cartridge of claim 1, wherein the through hole of the faucet body is configured to be an internal threaded hole, and the locating unit is configured to be a bolt to screw through the internal threaded hole into the first chamber.

3. The faucet with a quickly replaceable valve cartridge of claim 1, wherein a lower portion of the locating groove of the valve cartridge base has an oblique surface.

4. The faucet with a quickly replaceable valve cartridge of claim 3, wherein a first threaded section is formed at an inner periphery of the accommodating space of the valve cartridge base to engage with an engaging ring thereby securing the valve cartridge inside of the accommodating space, and a sealing ring is disposed on the outer periphery of the valve cartridge base to provide sealing effect between the valve cartridge base and the first chamber, a second threaded section is formed at an upper outer periphery of the valve cartridge base to engage with a cover, and the valve cartridge comprises a control rod sticking out from the valve cartridge base to connect to a handle.

5. The faucet with a quickly replaceable valve cartridge of claim 1, wherein the faucet body has two water inlet channels for hot water and cold water respectively that are connected with two corresponding water inlet holes on the valve cartridge base, and a gasket is disposed on each of the water inlet holes and the water outlet hole which are formed at a bottom portion of the valve cartridge base.

6. The faucet with a quickly replaceable valve cartridge of claim 5, wherein each of locating tubes is respectively extended from each of the water inlet holes and the water outlet hole which are formed at the bottom portion of the valve cartridge base, and each of the gaskets is respectively disposed on each of the locating tubes, and the locating tubes are respectively inserted into the water inlet channels and the water outlet channel to secure the valve cartridge base inside the faucet body.

* * * * *